United States Patent [19]

Harra

[11] Patent Number: 4,931,321

[45] Date of Patent: Jun. 5, 1990

[54] FROZEN FOOD COMPOSITION

[76] Inventor: John Harra, 155 W. 81st St., Apt. 31, New York, N.Y. 10024

[21] Appl. No.: 20,969

[22] Filed: Mar. 3, 1987

[51] Int. Cl.$^5$ .............................................. A23G 9/04
[52] U.S. Cl. .................................... 426/615; 426/474; 426/524; 426/565; 426/637
[58] Field of Search ............... 426/615, 524, 637, 474, 426/565

[56] References Cited

U.S. PATENT DOCUMENTS

| | | | |
|---|---|---|---|
| 2,431,704 | 12/1947 | Musher | 426/567 |
| 3,471,301 | 10/1969 | Mitchell et al. | 426/91 |
| 3,950,559 | 4/1976 | Kapoor et al. | 426/335 |
| 4,021,583 | 5/1977 | Arden | 426/134 |
| 4,110,476 | 8/1978 | Rhodes | 426/524 |
| 4,194,016 | 3/1980 | Weaver et al. | 426/524 |
| 4,244,981 | 1/1981 | Blake | 426/567 |
| 4,293,580 | 10/1981 | Rubenstein | 426/565 |
| 4,335,155 | 6/1982 | Blake et al. | 426/565 |
| 4,368,211 | 1/1982 | Blake et al. | 426/564 |
| 4,400,405 | 8/1983 | Morley et al. | 426/565 |
| 4,510,166 | 4/1985 | Lenchin et al. | 426/565 |
| 4,517,211 | 5/1985 | Haraldsson et al. | 426/444 |
| 4,555,410 | 11/1985 | Yamane | 426/524 |
| 4,608,262 | 8/1986 | Galland | 426/637 |
| 4,609,561 | 9/1986 | Wade et al. | 426/565 |

OTHER PUBLICATIONS

Kaloyereas, Socrates A., "Drip as a Constant for Quality Control of Frozen Foods", Food Research, 1947, vol. 12, No. 5, pp. 1–10.
*Meta Given's Modern Encyclopedia of Cooking*, vol. One, pp. 735, 743, 754–770, 779, 780, 782, 791, 798, 799, 813, 821, 822, 831, 832, and 843, published 1947.
*Meta Given's Modern Encyclopedia of Cooking*, vol. Two, pp. 1151 and 1173, published 1947.
More Receipts by Miss Leslie, p. 147, published 1852.
*Everbody's Cookbook*, edited by Isabel Ely Lord, pp. 227, 228, 252, 253, 256–278, 392–394, 414, 450–453, 603, 729, and 730, published 1924.
*The White House Cookbook*, Hugo Ziemann and Mrs. F. L. Gillette, pp. 333 and 334, published 1923.
*Cassell's Dictionary of Cookery*, pp. 730–733, 966, and 967, published 1881[?].
*Fruit & Vegetable Facts & Pointers, Rhubarb*, William A. Rowland, United Fresh Fruit and Vegetable Association, pp. 1–9, publication date unknown.
*Jane Brody's Good Food Book*, Jane E. Brody, pp. 161, 243, 264, 265, 591, 619, and 621, published 1985.
Arbuckle, W. S., "Ice Cream", 2nd Ed., The AVI Publishing Company, Inc., 1972, p. 403.

Primary Examiner—Virginia Manahoran
Attorney, Agent, or Firm—Eugene S. Indyk

[57] ABSTRACT

Fibrous and gelatinous vegetable matter is liquefied and frozen so as to result in a frozen food composition which is dripless and cohesive when exposed to temperatures above its melting point and which has reduced fat and cholesterol content. A preferred vegetable matter is edible rhubarb leafstalks. Various flavoring agents may be added to the vegetable matter. The frozen food composition closely approximates the characteristics of high grade ice cream. Even closer approximation to ice cream may be obtained by using dairy products as flavoring agents.

15 Claims, No Drawings

FROZEN FOOD COMPOSITION

FIELD OF THE INVENTION

This invention relates to the field of frozen food compositions. More specifically, this invention relates to dripless frozen food compositions having reduced fat and cholesterol content and a method or process of making those compositions.

BACKGROUND OF THE INVENTION

In recent years, doctors and nutritionists have raised concerns about the amount of fat and cholesterol in foods because high levels of dietary fat and cholesterol have been linked to various disorders such as heart disease. It therefore has been recommended that the levels of fats and cholesterol in the diet be reduced.

Significant dietary sources of fat and cholesterol are foods containing dairy products. Those sources include frozen desserts containing high fat content dairy products, such as ice cream. Significant attention has been directed toward reducing consumption of such foods and substitution of foods having reduced cholesterol and fat content.

However, the demand for frozen foods containing high fat content dairy products has continued because of the desirable properties possessed only by those foods until now. Prior substitutes for frozen food compositions containing high fat content dairy products have generally not been able to duplicate those desirable properties. Those prior substitutes have been based on reducing the amount of dairy products or reducing the fat content of the dairy products used in those foods as compared with the amount of dairy products or the fat content of those dairy products used in prior food compositions such as ice cream. Reduction of the fat content of the dairy products in those foods has generally resulted in a diminution in the qualities for which those frozen foods are prized. For example, substitution of milk or other lower fat content dairy product for cream in ice cream has resulted in a food composition which is less rich and less smooth in texture. The flavor of such reduced fat content compositions is materially affected. For example, ice milk has a less creamy flavor and frozen yogurt has an acidic flavor. Also, many of those compositions, for example, sherbets and ice milks, have a noticeably icy taste and texture.

Other prior substitutes are based on complete elimination of dairy products. Frozen food compositions not containing any dairy products are even less satisfactory than the compositions containing reduced fat content dairy products. Such food compositions, for example, flavored ices, sherbets, and sorbets, are very much lacking in the texture and flavor of ice cream. The icy character of those compositions tends to predominate.

Recently, efforts have been made to prepare frozen dessert compositions from soybean curd. These food compositions have been unsatisfactory because of an unnatural mouthfeel and an unpleasant aftertaste left after eating them. Such compositions also melt very rapidly making them inconvenient to eat.

The substitutes for frozen food compositions containing large amounts of high fat content dairy products have not significantly affected the consumption of food containing large amounts of high fat content dairy products, and probably will not affect such consumption, in light of the unsatisfactory characteristics of those substitutes to date. Thus, not much progress has been made in reducing dietary fat and cholesterol intake through a change in the character of frozen foods. Thus, there is a need for a frozen food composition which has all the characteristics of frozen food compositions containing large amounts of high fat content dairy products, but does not have the high fat and cholesterol content.

An additional drawback of prior frozen food compositions containing dairy products is that dairy products are relatively expensive to make. Frozen foods containing such dairy products tend to be relatively high in cost. There is a need to produce a substitute for such frozen food compositions that is lower in cost without sacrificing the desirable characteristics of those food compositions.

In addition to the nutritional and cost concerns involved with the production and consumption of frozen foods containing dairy products, there are other undesirable properties possessed by those foods and prior substitutes for those foods. A particularly troublesome characteristic of those foods is that they lose their cohesiveness and drip as they melt. This is caused by the substantial differences in properties of these compositions in the solid and liquid states. In the solid state, these compositions are thick and highly cohesive. In the liquid state, they have low viscosity and are not cohesive at all. The loss of cohesiveness and drippage of prior melting frozen food compositions require that they be served and eaten at a temperature substantially below their melting points. Such low temperature allows them to be eaten in a reasonable time before they begin to drip and lose their cohesive character. The low temperature, however, reduces the sensitivity of the taste buds on the tongue to the flavor of the food composition. Prior frozen food compositions thus are not highly flavorful unless a relatively large amount of flavoring agent is used in preparing those compositions.

In addition to requiring that the food composition be served at a low temperature, the loss of cohesiveness and drippage can result in soiled hands, clothing, and the like if care is not taken when these foods are eaten. This is a special concern when these foods are in the form of ice cream cones, popsicles, and the like eaten by small children.

There thus is a need for a frozen food composition which maintains its character as a cohesive and solid mass when exposed to a temperature above its melting point, which resists drippage as it melts, and which is able to be conveniently served and consumed at a higher temperature than prior frozen food compositions.

Accordingly, it is an object of the invention of this application to provide a food composition that does not have the problems described above.

It is an object of the invention to provide a food composition and a method or process of making such food composition, the food composition having substantially the same characteristics of frozen food compositions containing dairy products, but without high fat and cholesterol content.

It is a further object of the invention to provide a food composition which is usable more conveniently at higher temperatures and does not have a tendency to drip and lose its cohesiveness as it melts.

SUMMARY OF THE INVENTION

Fibrous and gelatinous vegetable matter is used to produce a frozen food composition which has reduced fat and cholesterol content as compared with prior frozen food compositions containing large amounts of high fat content dairy products, such as ice cream. The food compositions in accordance with this invention have dramatically reduced drippage and increased usability at higher temperatures as compared with prior frozen food compositions containing dairy products and also as compared with those not containing dairy products. The compositions in accordance with this invention may be produced without the addition of artificial ingredients. They substantially have all the important desirable characteristics of prior compositions containing high fat content dairy products, including taste, texture, and stability. They may be made without the complexity and expense of making food compositions containing dairy products.

DESCRIPTION OF THE INVENTION

The invention of this application relates to a food composition and a process of making that composition. The food composition may be used, for example, as a frozen dessert in place of prior frozen desserts such as ice creams, ice milks, frozen yogurts, frozen tofu, sherbets, parfaits, flavored ices, popsicles, sorbets, and the like.

The process of making the food composition comprises liquefying fibrous and gelatinous vegetable matter, which preferably may be edible rhubarb leafstalks.

A specific example of a process for preparing a frozen food composition in accordance with the invention is as follows. First, rhubarb leafstalks are cut into small pieces, such pieces being on the order of one inch long. The size of the pieces is not critical as long as they are convenient to handle for performing the processing steps described below. The larger the pieces are, however, the longer are the fibers in the composition resulting from the process described below. It is believed that longer fibers are helpful in rendering the resulting frozen food composition a more cohesive mass and more free from drippage.

After having been cut into pieces, the rhubarb is then cooked or heated until a viscous and gelatinous mass results. The cooked rhubarb should be relatively elastic and translucent and fibers should be evident. This condition may be achieved by cooking the rhubarb in a small quantity of water on an ordinary kitchen stove. The amount of water should be as little as possible and should be just enough to provide steam for cooking the rhubarb. For example, about one cup of water for about four pounds of rhubarb has proven satisfactory. The amount of water also should be enough to prevent the rhubarb from burning in the initial stages of cooking. In later stages of cooking, liquid released from the cooking rhubarb will be enough to prevent such burning. As the rhubarb releases liquid during cooking, more uncooked rhubarb may be added to the cooking rhubarb without the addition of water until the desired amount of rhubarb is being liquefied.

Before cooking or during cooking, sugar or sugar substitute, either naturally occurring or man-made, may be added to the rhubarb as a flavoring agent. The amount of such sugar or sugar substitute added to the rhubarb is not critical and is dictated by the desired sweetness of the resulting food composition.

When a desired amount of rhubarb has been cooked so that it has the desired consistency described above, a further liquefaction step may be performed. This additional step comprises placing the cooked rhubarb in a blending apparatus which may be an ordinary kitchen blender. The cooked rhubarb is further liquefied until a relatively uniform, gelatinous, and cohesive mass is formed.

Next, an additional flavoring agent may be added to the liquefied rhubarb. A preferred flavoring agent is liquefied raw or cooked fresh fruit. By way of example, an equal volume of liquefied raw fruit may be added to an equal volume of cooked rhubarb. The fruit is first peeled and cored, if necessary, and then cut it into small pieces. The fruit is then liquefied in a blending apparatus which again may be an ordinary kitchen blender. The fruit is mixed in the blending apparatus until a uniform consistency is achieved. Sugar or sugar substitute, either naturally occurring or man-made, may be added to the fruit as a further flavoring agent depending on the desired sweetness of the resulting food composition. The liquefied fruit is then mixed with the cooked rhubarb either by hand or in a blending apparatus until the constituents are uniformly mixed. The mixing step may be dispensed with as the components will be mixed in a preferred subsequent freezing process described below. Also, instead of separately liquefying the fruit, the fruit pieces may be added directly to the liquefied rhubarb and the mixture of fruit pieces and liquefied rhubarb may be further liquefied together in a blending apparatus as described above.

The mixture of rhubarb and fruit is then frozen. Preferably, the freezing of this mixture is accomplished in a dynamic freezing apparatus, that is, the mixture is continuously stirred or mixed as it is being frozen. Even more preferably, the mixture should be frozen in an apparatus which continuously folds the mixture so that air is continuously trapped in the mixture. This tends to increase the volume of the mixture and to increase the smoothness and richness of texture of the resulting frozen food composition. The dynamic nature of the freezing process also insures that the components of the mixture are evenly mixed and the freezing of the resulting composition is uniform. An example of a suitable freezing apparatus is an ice cream making machine, for example, a model Il Gelataio Super ice cream making machine manufactured by Simac, which continuously folds, gathers up, and smooths the mixture of rhubarb and flavoring agent as it moves the mixture around a uniformly cold freezing surface. When a desired frozen consistency is achieved, the frozen food composition is removed from the freezing apparatus and may be immediately consumed or stored for future consumption.

The resulting frozen food composition surprisingly has the general appearance, taste, and feel of ice cream or other frozen food composition containing high fat content dairy products. It is smooth in texture and it has a pastel color which depends on the flavoring agent used. Although not necessary, a coloring agent may be added to adjust the color of the composition. Immediately after it is made, the frozen food composition has the consistency of soft ice cream, such as those sold under the Carvel or Dairy Queen brand names. Storage in a freezing apparatus such as a kitchen freezer results in a harder frozen food composition similar to hard ice cream found in supermarkets. When subjected to approximately 50X to 75X magnification under an optical microscope, the food composition appears to have a very small ice crystal structure with many very small air bubbles. The fibers of the rhubarb and flavoring agent are evident when the composition is subjected to such magnification.

The use of gelatinous and fibrous vegetable matter such as rhubarb lends some surprising properties to the frozen food composition. The vegetable matter apparently is a relatively nonflavorful bulk producing agent. In other words, the resulting frozen food composition does not take on a noticeable flavor from the vegetable matter to any great extent. In the example of the invention given in this application, it is only when rhubarb is used with a desired amount of sugar or sugar substitute as the sole flavoring agent that the resulting frozen food composition takes on the flavor of rhubarb.

Although the resulting frozen food composition does not take on much of the flavor of the vegetable matter used to make it, it is believed that the natural acidity and tartness of fibrous and gelatinous vegetable matter such as rhubarb tends to enhance the flavor of the flavoring agents added to frozen food compositions in accordance with the invention. It is also believed that the acidity of the rhubarb acts as a stabilizer which prevents oxidation in those frozen food compositions.

If additional bulk is desired for the frozen food composition, starchy vegetable matter may be added to the rhubarb. Examples of such starchy vegetable matter may be derived from potato or other starchy tuber or root, or it may be starchy vegetable matter derived from a legume.

Drippage is a phenomenon which has been a constant problem in the field of frozen food compositions, especially when these compositions have been consumed by small children. Apparently, fibrous and gelatinous vegetable matter such as rhubarb unexpectedly and surprisingly reduces drippage of the resulting frozen food composition. Drippage is the usual well known behavior of frozen food compositions as their temperature is increased above their freezing points. It is a localized melting and formation of a liquid film on the surface of a solid mass of the composition, the surface tension of such liquid film being insufficient to prevent the formation of liquid droplets which become separated from the mass of the composition when subjected to external forces such as gravity. Drippage is not gross physical separation of the composition into two or more solid masses due to the cohesive forces of a solid mass of the composition having been overcome by tensile or shearing forces. Fibrous and gelatinous vegetable matter such as rhubarb apparently binds the liquid phase of the food composition to the solid phase so as to prevent drippage.

It has been found that a mass of the composition, when exposed to elevated temperatures, such as room temperature or even to outside temperatures in the summer, will maintain its cohesiveness and will not drip even when the composition is exposed to such temperatures for several hours at a time. Not only will the composition not lose its cohesiveness or drip, but also it will retain the characteristics of a frozen food composition such as ice cream after several hours of exposure to elevated temperatures. In other words, the frozen food composition in accordance with this invention will be more solid for longer periods of time than prior compositions when exposed to elevated temperatures above its melting point.

As a dramatic illustration of the driplessness and cohesiveness of the frozen food composition in accordance with this invention, a sample of the frozen food composition has been subjected to the heat of a burner in a conventional kitchen stove and to the fire of a lighted match. In both instances, no drippage or loss of cohesiveness took place. The food composition burned black and began to bubble before any drippage or loss of cohesiveness occurred.

It is believed that the gelatinous and fibrous nature of vegetable matter such as rhubarb acts as a binding agent which prevents a liquid phase from separating from a frozen and solid mass of the food composition. The characteristics of the liquid phase also are rendered not that much different from the characteristics of the solid phase in terms of driplessness and cohesiveness. The degree of cohesiveness and driplessness may be varied by adjusting the amount of fibrous and gelatinous vegetable matter with respect to the amount of flavoring agent and other ingredients which may be used, such as the additional bulk producing agents described above. More specifically, in the detailed process given in this application, increasing the amount of rhubarb with respect to the amount of flavoring agent and other ingredients will increase the degree of cohesiveness and driplessness. It is also believed that the frozen food composition has self insulating properties which help it maintain desirable characteristics very much like prior frozen food compositions even after prolonged exposure to temperatures which would melt prior frozen food compositions. It is believed that these self insulating properties are improved by a dynamic freezing process which traps many small air bubbles in the frozen food composition.

Aside from concerns about cleanliness, the dripless nature of the frozen food composition yields an additional unexpected benefit. The lack of drippage allows the composition to be served and eaten at a higher temperature than is the case with prior frozen food compositions. The taste buds on the tongue are more sensitive at higher temperatures, such sensitivity increasing the perceived flavor of foods eaten at those temperatures. This allows less flavoring agent to be used. This is particularly important in the case of sugar or other sweetener being added to the composition to increase sweetness as there has been medical concern about the amount of sugar consumed in the diet. The food composition in accordance with this invention addresses this concern because it permits less sugar or other sweetener to be used for a given perceived sweetness. Adjusting the fibrous and gelatinous vegetable matter content will alter the temperature at which the frozen food composition may be conveniently served and eaten because the cohesive and dripless nature of the composition will be accordingly altered.

A variety of flavoring agents may be employed. If one were to desire a frozen food composition having a rhubarb flavor, no additional flavoring agent would be needed except for sugar or other sweetener to give the product a desired sweetness. As mentioned above, fresh fruit, either cooked or raw, may be used as a flavoring agent. For example, blueberries, peaches, strawberries, bananas, cantaloupe, nectarines, citrus fruits, pears, plums, or any other fruit singly or in combination may be used. In the case of high water content fruits such as citrus fruits, it may be necessary to add a neutral moisture absorbing substance to the food composition to absorb excess moisture. Also, canned fruit, fruit preserves, or fruit derivatives such as dehydrated banana chips or flakes may be used. Vanilla bean, vanilla extract, or chocolate may also be used. Seasonings such as cinnamon, nutmeg, mace, ginger, mint, or marzipan may also be used. Nuts may be added to the frozen food composition.

Although not necessary to give a closer approximation to ice cream than any composition tried in the past, dairy products may be added as flavoring agents in making examples of frozen food compositions in accordance with this invention. The advantage of examples of the invention using dairy products as flavoring agents is that the richness, flavor, and texture of high quality ice cream may be more closely duplicated without the use of high fat content dairy products such as heavy cream. For example, high quality ice cream may be simulated by merely using milk as a flavoring agent in an example of a food composition according to the invention.

Frozen food compositions in accordance with the invention of this application have many new and unexpected properties. They may be made with reduced fat and yet they will closely approximate the properties of frozen food compositions using high fat content dairy products. It thus has reduced cholesterol levels and thus is more healthful. There is no requirement to use salt or artificial fillers, thickeners, or extenders. There is no messy drippage and the composition may be served at higher temperatures which enhances flavor. The composition is made with inexpensive naturally occurring ingredients using standard easily available equipment.

Although the process for making the food composition has been described in this application as using equipment normally found in the kitchen of a consumer, adaptation of the process for making the composition on a commercial scale is easily accomplished.

I claim:

1. A process of making a frozen rhubarb composition, comprising:
   liquefying rhubarb which comprises heating said rhubarb;
   mixing a flavoring agent with the liquefied rhubarb, the proportion of rhubarb to flavoring agent being such that the resulting frozen rhubarb is cohesive and dripless; and
   freezing the liquefied rhubarb.

2. The process of claim 1, further comprising the step of:
   liquefying the flavoring agent prior to mixing it with the liquefied rhubarb.

3. The process of claim 1, in which the flavoring agent comprises fruit.

4. The process of claim 1, in which the flavoring agent comprises a dairy product.

5. The process of claim 1, in which the freezing step comprises continuously stirring the liquefied rhubarb as it is being frozen.

6. The process of claim 1, in which the liquefying step further comprises: liquefying the heated rhubarb in a blending apparatus.

7. The process of claim 1, further comprising the step of:
   mixing starchy vegetable matter with the liquefied rhubarb.

8. The process of claim 7, in which the starchy vegetable matter is derived from a tuber or a legume.

9. The process of claim 8, in which the starchy vegetable matter is potato.

10. The process of claim 1, in which the step of freezing the rhubarb comprises the step of entrapping air in the rhubarb as it is being frozen.

11. The process of claim 1, in which the step of freezing the rhubarb comprises the step of dynamically freezing the rhubarb.

12. The process of claim 1, in which the flavoring agent comprises liquefied raw fruit.

13. The process of claim 1, in which the flavoring agent comprises cooked fruit.

14. A process of preparing a frozen rhubarb composition, comprising the steps of:
    cutting rhubarb leafstalk into pieces;
    liquefying the rhubarb leafstalk pieces by cooking them;
    further liquefying the cooked rhubarb in a blending apparatus;
    adding a flavoring agent comprising raw or cooked fruit to the liquefied rhubarb; and
    dynamically freezing by constant stirring of the mixture of liquefied rhubarb and flavoring agent.

15. The process of claim 14, in which the adding step comprises the steps of:
    liquefying said raw or cooked fruit; and
    mixing the liquefied raw or cooked fruit with the liquefied rhubarb.

* * * * *